Patented Oct. 16, 1945

2,386,779

UNITED STATES PATENT OFFICE 2,386,779

INSECTICIDAL COMPOSITIONS

Gerald H. Coleman, Wesley D. Schroeder, and Gerald A. Griess, Midland, Mich., assignors to The Dow Chemical Company, Midland, Mich., a corporation of Michigan No Drawing. Application September 15, 1941, Serial No. 410,874

8 Claims. (Cl. 167—24)

The present invention is directed to new insecticidal materials and is particularly concerned with compositions comprising an insecticidal plant extract and as an added toxicant an alkanamide having the following formula:

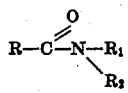

wherein R and $R_1$ each represents an alkyl radical containing from 1 to 4 carbon atoms, inclusive, and $R_2$ represents an aryl radical. These alkanamides are relatively insoluble in water and somewhat soluble in many organic solvents. In the amounts employed, members of this group of compounds do not impart irritating properties or an objectionable odor to the ultimate composition.

When an insectical composition comprising an extract of a pyrethrin- or rotenone-containing plant material is modified with a small percentage of N-alkyl-N-aryl-alkanamide, a product is obtained in which the amide and natural occurring toxicant are activated one by the other. Kills of insects are obtained with such mixtures which are greatly in excess of those predictable from a knowledge of the toxicities of the components of the compositions. By reason of the desirable coaction between the plant extracts and amides, and relatively innocuous nature of the amides as regards irritation and odor, the new compositions constitute a definite advance in the parasiticidal art.

The N-alkyl-N-aryl-alkanamide toxicants may be employed in any suitable proportion with pyrethrin- and rotenone-containing parasiticidal materials. From about 5 to about 50 grams of the amide per liter is preferably employed in spray compositions falling within the scope of the invention. A prefered spray solvent for such toxicant mixture is petroleum distillate, although any suitable non-corrosive organic solvent for the plant extract and amide may be employed. If desired, concentrates containing high concentrations of both amide and plant extract may be prepared. In further embodiments of the invention the amides may be incorporated in aqueous dispersions and emulsions or in dusts comprising rotenone or pyrethrins. Suitable carriers for such dust compositions include wood flour, diatomaceous earth, volcanic ash, bentonite, etc.

The following example is illustrative of certain modes in which the invention may be applied, but is not to be construed as limiting. In this example the procedure followed was substantially that described in soap 8, No. 4, 1932, and known as the Peet-Grady method. The pyrethrin-containing solution employed both as a control and as a solvent in preparing solutions of the amides consisted of a standard light petroleum distillate having dissolved therein the toxic principles from one-half pound of pyrethrum flowers per U. S. gallon of composition. This solution is hereinafter referred to as "pyrethrin control solution."

*Example*

2.5 gram portions of a number of representative N-alkyl-N-aryl-alkanamides were each dissolved in a 100 milliliter portion of the pyrethrin control solution described above. Compositions were also prepared by dissolving 2.5 grams of each of the several amides in 100 milliliter portions of the petroleum distillate employed in the preparation of the pyrethrin control solution. Both series of amide solutions and the pyrethrin control solution alone were tested against five day old houseflies according to the Peet-Grady method to determine the comparative efficiency of the toxicant mixtures as contact insecticides.

The following table sets forth the results obtained.

| Name of compound | Properties | In petroleum distillate | | In pyrethrin control solution | |
|---|---|---|---|---|---|
| | | Knockdown in 10 mins. | Kill in 24 hours | Knockdown in 10 mins. | Kill in 24 hours |
| N-normalbutyl-N-phenyl-acetamide | Boiling at 113°-115° C. at 1 mm. pressure and having a sp. gr. of 0.988 at 25°/25° C. | 88.5 | 14.5 | 99.9 | 59.4 |
| N-methyl-N-(4-tertiaryamylphenyl)-acetamide | Boiling at 124°-126° C. at 1 mm. pressure and having a sp. gr. of 0.987 at 25°/25° C. | 95.3 | 13.7 | 99.9 | 54.4 |
| N-normalbutyl-N-phenyl-2,2-dimethyl-propionamide | Boiling at 270°-275° C. at atmospheric pressure and having a sp. gr. of 0.930 at 25°/25° C. | 64.5 | 8.3 | 99.9 | 48.8 |
| N-ethyl-N-phenyl-propionamide | Boiling at 90°-92° C. at 1 mm. pressure and having a sp. gr. of 1.010 at 25°/25° C. | 68.4 | 6.6 | 99.9 | 55.1 |
| N-ethyl-N-phenyl-acetamide | Melting at 53°-54° C. | 73.9 | 5.5 | 99.4 | 54.7 |
| N-methyl-N-phenyl-acetamide | Melting at 98.5°-100° C. | 89.5 | 8.1 | 100.0 | 55.8 |
| N-ethyl-N-phenyl-isobutyramide | Boiling at 88° C. at 1 mm. pressure and having a sp. gr. of 0.983 at 25°/25° C. | 96.3 | 25.1 | 100.0 | 72.2 |
| Pyrethrin control solution | | | | 100.0 | 23.6 |

From the foregoing it is evident that the combination of pyrethrin with the N-alkyl-N-aryl-alkanamides results in compositions giving a kill against houseflies greatly in excess of what might be predicted from a knowledge of the toxicities of individual components of the mixtures.

In a similar manner the N-alkyl-N-aryl-alkanamides or mixtures of two or more of such compounds may be combined with derris or other rotenone-containing plant extract. Likewise mixtures of pyrethrin- and rotenone-containing extracts may be used in combination with the amides. Other amides which may be advantageously employed in combination with the plant extracts include N-methyl-N-xylyl-acetamide, N - propyl - N - phenyl - acetamide, N - isobutyl-N-phenyl-acetamide, N-ethyl-N-phenyl-trimethyl-acetamide, N-ethyl-N-tolyl-acetamide, N-isopropyl-N-xenyl-acetamide, N-secondarybutyl-N-naphthyl - acetamide, N-ethyl-N-(4-cyclohexylphenyl)-acetamide, etc.

The phrase "non-corrosive organic solvent" refers to any organic solvent material unreactive with and capable of dissolving the toxicants hereinbefore described and non-injurious to the skin and general health of humans as employed, e. g. alcohol, methyl-ethyl-ketone, ethylene chloride, solvent naphtha, petroleum distillates, etc.

We claim:

1. An insecticidal composition comprising a product selected from the class consisting of the extracts of pyrethrin- and rotenone-bearing plants and as an added toxicant an amide having the formula:

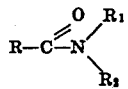

wherein R and $R_1$ each represents an alkyl radical containing from 1 to 4 carbon atoms, inclusive, and $R_2$ represents an aryl radical.

2. An insecticidal composition comprising pyrethrins and an amide having the formula:

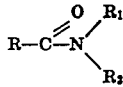

wherein R and $R_1$ each represents an alkyl radical containing from 1 to 4 carbon atoms, inclusive, and $R_2$ represents an aryl radical.

3. A liquid insecticidal composition comprising a solution in a non-corrosive organic solvent of a product selected from the class consisting of the extracts of pyrethrin- and rotenone-bearing plants and as an added toxicant an amide having the formula:

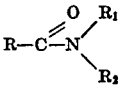

wherein R and $R_1$ each represents an alkyl radical containin from 1 to 4 carbon atoms, inclusive, and $R_2$ represents an aryl radical.

4. A liquid insecticidal composition comprising a substantially non-aqueous solution of a product selected from the class consisting of the extracts of pyrethrin- and rotenone-bearing plants and as an added toxicant an amide having the formula:

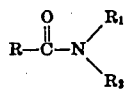

wherein R and $R_1$ each represents an alkyl radical containing from 1 to 4 carbon atoms, inclusive, and $R_2$ represents an aryl radical.

5. An insecticidal composition comprising a petroleum distillate solution of pyrethrins and an amide having the formula:

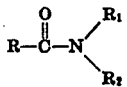

wherein R and $R_1$ each represents an alkyl radical containing from 1 to 4 carbons atoms, inclusive, and $R_2$ represents an aryl radical.

6. An insecticidal composition comprising a product selected from the class consisting of the extracts of pyrethrin- and rotenone-bearing plants and as an added toxicant an acetamide having the formula:

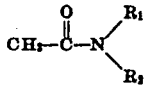

wherein $R_1$ represents an alkyl radical containing from 1 to 4 carbon atoms, inclusive, and $R_2$ represents an aryl radical.

7. An insecticidal composition comprising a product selected from the class consisting of the extracts of pyrethrin- and rotenone-bearing plants and as an added toxicant an amide having the formula:

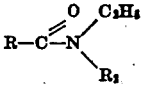

wherein R represents an alkyl radical containing from 1 to 4 carbon atoms, inclusive, and $R_2$ represents an aryl radical.

8. An insecticidal composition comprising a product selected from the class consisting of the extracts of pyrethrin- and rotenone-bearing plants and as an added toxicant an amide having the formula:

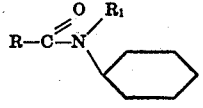

wherein R and $R_1$ each represents an alkyl radical containing from 1 to 4 carbon atoms, inclusive.

GERALD H. COLEMAN.
WESLEY D. SCHROEDER.
GERALD A. GRIESS.